(No Model.) 2 Sheets—Sheet 1.

A. WISSLER.
CONVEYER.

No. 377,821. Patented Feb. 14, 1888.

WITNESSES.
Miller C. Ammon.
Ida F. Kinsey.

INVENTOR.
Aaron Wissler
By W. J. Stewart, atty.

(No Model.) 2 Sheets—Sheet 2.
A. WISSLER.
CONVEYER.
No. 377,821. Patented Feb. 14, 1888.
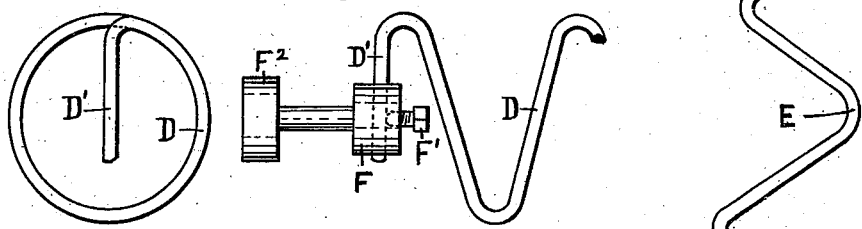
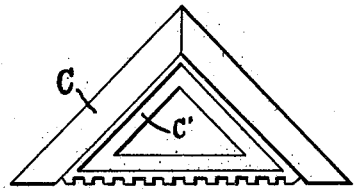
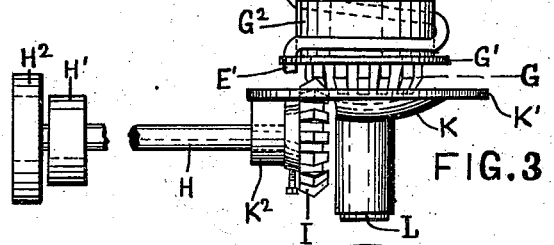
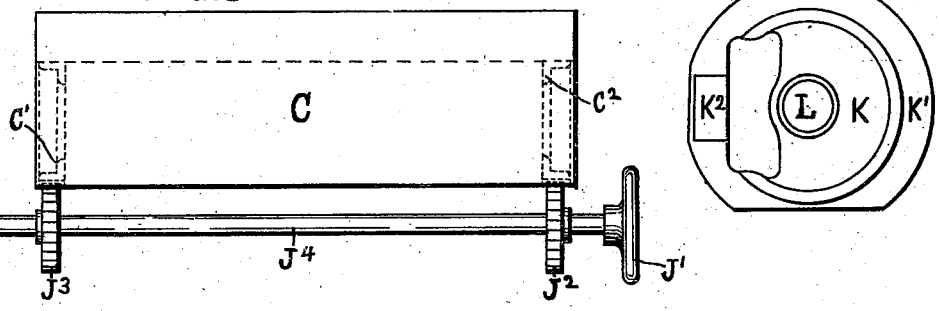
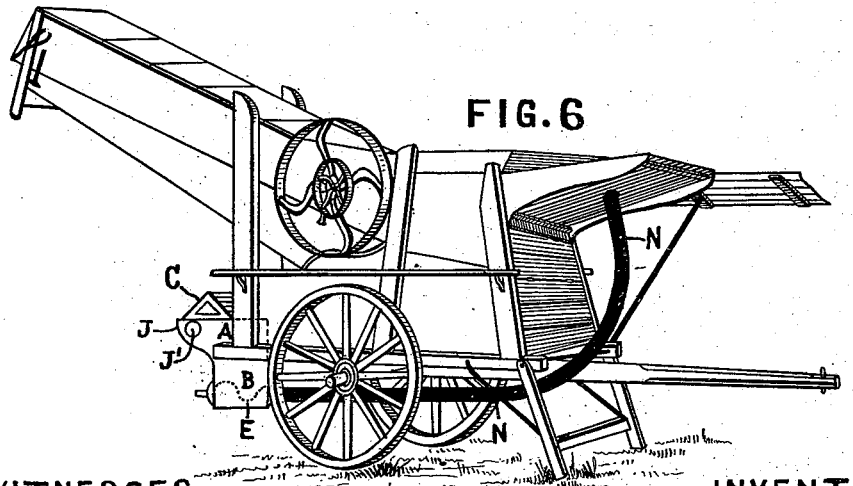
WITNESSES. INVENTOR.

UNITED STATES PATENT OFFICE.

AARON WISSLER, OF BRUNNERSVILLE, PENNSYLVANIA.

CONVEYER.

SPECIFICATION forming part of Letters Patent No. 377,821, dated February 14, 1888.

Application filed June 24, 1887. Serial No. 242,424. (No model.)

*To all whom it may concern:*

Be it known that I, AARON WISSLER, a citizen of the United States, residing at Brunnersville, in the county of Lancaster and State of Pennsylvania, have invented certain new and useful Improvements in Conveyers; and I do hereby declare the following to be a full, clear, and exact description of the invention, such as will enable others skilled in the art to which it appertains to make and use the same.

This invention relates more particularly to the class of conveyers which are adapted to carry grain from point to point; but it is also adapted to convey tan, planer-chips, small coals, and other similar articles. It is connected with the coil-conveyer patented to the said Aaron Wissler October 19, 1886, No. 351,014, and is an improvement on and an addition to said conveyer.

The object of the improvement is to enable the coil-conveyer to take hold of and work onward the material fed to it, avoiding any difficulty due to the "packing" of said material; also, to provide an effective and simple means of connecting the conveyer and feeding coils to the shafts by which they are revolved; also, to provide, in combination with such conveyers on a grain thrasher and separator, an easily-adjustable device to separate the "tailings," which it is desired to again pass through the conveyer, from the chaff and to carry the former direct to the feeding-table.

The drawings herewith, in which similar letters of reference indicate similar parts, together with the following description, will enable an expert readily to understand and put into practical use the improvements which I wish to claim.

Figure 1:
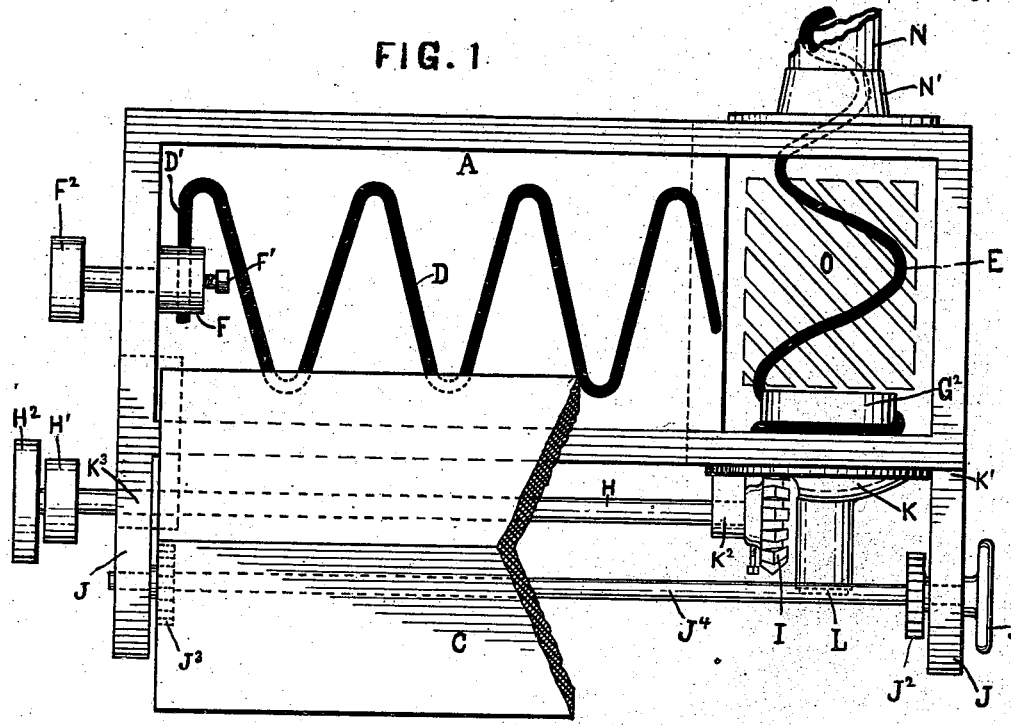
Figure 2:
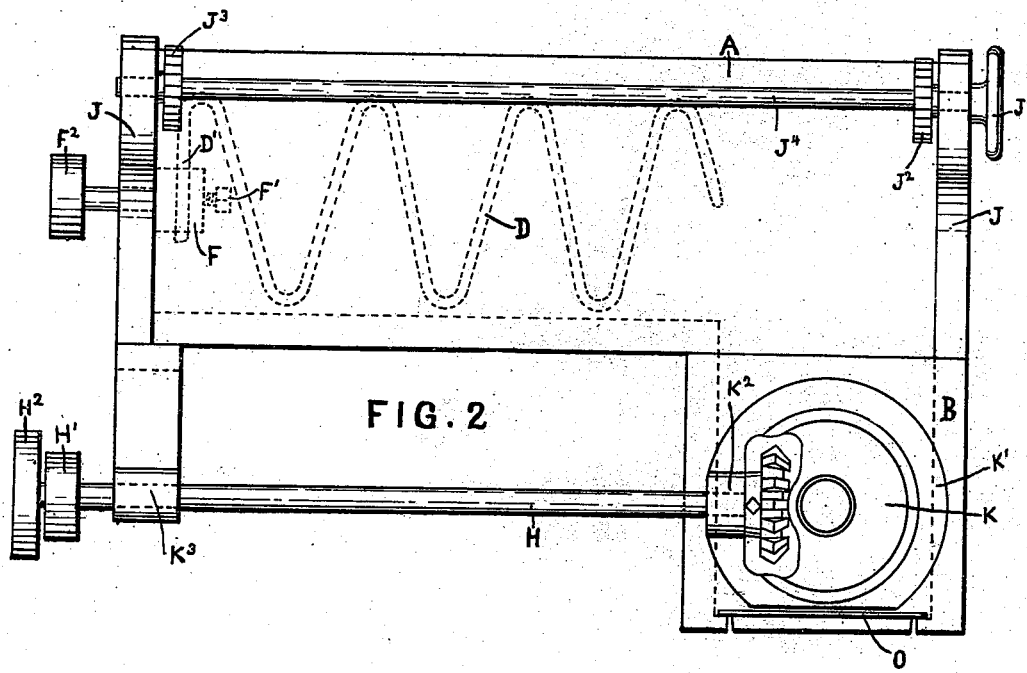

Figure 1 represents in plan the complete combination of my improvements as applied to a thrashing-machine. Fig. 2 is a side elevation of the same. Fig. 3 shows one end of the conveyer-coil and its connections with the pulleys H' and H². Fig. 4 shows the end of the feeding-coil and its connection with its revolving shaft. Fig. 5 shows the divider-frame in side elevation and end view, together with the apparatus by which it is adjusted. Fig. 6 is a perspective view of a thrashing-machine, showing the position of the tailing-box and the manner in which the conveyer-coil connects the same directly with the feeding-table.

In the drawings, A represents the tailing-box, having the conveyer-box B attached to the bottom at one end, said conveyer-box being provided with a slide-screen, O, which may be readily changed to suit the character of the work.

D is the feeding-coil, having its one end D' straightened out, so that it may be inserted in the enlarged shaft F, and, after being adjusted to its proper position, may be held by the set-screw F' and revolved with the pulley F², thus feeding the tailings into the box B. The coil D extends only to the beginning of the box B, so that the tailings can fall freely into said box and on top of the conveyer-coil E.

The conveyer coil, constructed substantially as described in the specification forming part of Letters Patent No. 351,014, issued to me October 19, 1886, has its one end E enlarged in diameter and increased in pitch where it passes through the box B, and then tapers through the cone-piece N' until it gets down to its ordinary size in the case N, through which it runs to any desired point. This end E of the conveyer is connected to the driving-collar G', formed integral with the drum G² and the miter-teeth G, by means of the hook E', extending through a hole in the collar, the hook E' being the same as is used in chucking the wire for forming the coil. The strain of the work tends to keep the hook E' in position, and no fastening is necessary. The coil is wound once around the drum G² before having its pitch extended, as described, so that it may make about one turn only between the drum G² and the cone N'. The metal frame K, fastened through its flange K' to the outside of the conveyer-box, forms a bearing for the shaft L, to which the drum-piece G G' G² is attached, and it also has a lug, K², forming a bearing for the shaft H, to which the miter-wheel I, gearing with miter-wheel G, is fastened, and which revolves with the pulley H'. The brackets J, extending from the ends of the tailing-box, form bearings for the shaft J⁴, to which are attached pinion-wheels J² J³, adapted to gear into the racks C' C², forming the ends of the "divider-slide" C, which by the turning of the hand-wheel J' may be moved toward or away from the tailing-box A.

The operation of the combined attachment is as follows: The tailing-box A and its attachments being fastened to the thrashing-machine in the position shown in Fig. 6 in substantially the same manner as is now common, the divider C is set to a position in which it extends over the tailing-box enough to prevent the chaff, which is projected farther by the blast than the tailings, from striking against the nearest inclined side of the divider, thus throwing the chaff beyond the machine, while the tailings are dropped into the box on top of and all around the coil D, which, being revolved in the proper direction by the pulley $F^2$, works it over toward the conveyer-box B. This box being wide open on top and the coil D extending only to its edge, the tailings have free access to it and cannot "pack" and obstruct the machine, which is apt to be the case when the opening is reduced, or when the coil D extends over the opening. The end of the conveyer-coil E being enlarged in diameter and extended lengthwise, so as to form about one coil only in the width of the box, and being, preferably, of a material similar to Bessemer steel and of a small diameter, will vibrate and spring under the strain of working, and the tailings are readily pushed forward by the revolution of the coil in the proper direction by means of the miter-wheels G and I, the shaft H, and pulley H' into the case N, and thence to the point desired. In Fig. 6 the coil is shown running upward with an easy curve and going through the feeding-table, thus conveying the tailings directly to the starting-point without any handling. When the coil is of practically the same diameter or pitch in the conveyer-box that it is in the case N, it cannot be depended upon to do any lifting. If the strength of the blast should be changed, or, for any reason, it is desirable, the divider C may be quickly adjusted by means of the hand-wheel J', or it may be removed entirely without any preparation whatever.

The improvements above described having been already applied to the machines manufactured by me, and having proved to be of great practical advantage, I desire to secure by Letters Patent the following claims thereon:

1. A coiled metal conveyer provided with an end, E, having an increased diameter and pitch, substantially as shown, and for the purpose set forth.

2. A coiled metal conveyer provided at one end with a projecting foot, E', in combination with a collar, G', provided with a hole adapted to receive said projecting foot, and a drum, $G^2$, and miter-wheel G, formed integral with said collar, substantially as shown and described.

3. A coiled metal conveyer provided with an end having an increased diameter and pitch and a projecting foot, E', in combination with the miter-wheel G, having collar G' and drum $G^2$, the shaft L, the frame K, having flange K' and bearing $K^2$, the miter-wheel I, shaft H, bearing $K^3$, and pulley H', substantially as shown and described, and for the purpose set forth.

4. A coiled metal conveyer having its end D' adapted to fit in the enlarged hub on shaft F and to be adjustably held therein by the set-screw F', in combination with the hub on shaft F and set-screw F', substantially as shown and described.

5. As an improvement in thrashing-machines, the tailing-box A, provided with conveyers D and E and brackets J, in combination with the divider-frame C, having metallic ends C', provided with racks $C^2$, pinions $J^2$ $J^3$, hand-wheel J', and shaft $J^4$, substantially as shown and described, and for the purpose set forth.

6. An apparatus comprising the following elements: the tailing-box A, the conveyer-box B, the removable screen O, the feed-coil D, conveyer-coil E, case N, running from said conveyer-box through the feeding-table, miter-wheels G and I, shafts L and H, brackets J, shaft $J^4$, pinions $J^2$ $J^3$, divider-frame C, and ends C', provided with rack $C^2$, all substantially as shown and described, and for the purpose set forth.

In testimony whereof I affix my signature in presence of two witnesses.

AARON WISSLER.

Witnesses:
MILLER C. AMMON,
ROBT. L. KEITH.